United States Patent [19]
Davenport et al.

[11] Patent Number: 5,259,056
[45] Date of Patent: Nov. 2, 1993

[54] COUPLER APPARATUS FOR USE WITH A HIGH BRIGHTNESS LIGHT SOURCE

[75] Inventors: John M. Davenport, Lyndhurst; Richard L. Hansler, Pepper Pike, both of Ohio

[73] Assignee: General Electric Company, Schenectady, N.Y.

[21] Appl. No.: 859,186

[22] Filed: Mar. 27, 1992

[51] Int. Cl.⁵ .............................................. G02B 6/04
[52] U.S. Cl. ..................................... 385/115; 385/46; 385/88; 385/89
[58] Field of Search ............................... 385/115–119, 385/121, 92, 93, 88, 89, 15, 46, 28

[56] References Cited

U.S. PATENT DOCUMENTS

| | | | |
|---|---|---|---|
| 4,377,086 | 3/1983 | Linder et al. | 385/12 |
| 4,408,827 | 10/1983 | Güthrie et al. | 385/15 |
| 4,984,864 | 1/1991 | Blyler et al. | 385/46 |
| 5,029,957 | 7/1991 | Hood | 385/33 |
| 5,058,985 | 10/1991 | Davenport et al. | 385/115 |
| 5,117,472 | 5/1992 | Blyler et al. | 385/28 |

*Primary Examiner*—Rodney B. Bovernick
*Assistant Examiner*—John Ngo
*Attorney, Agent, or Firm*—George E. Hawranko; Stanley C. Corwin

[57] ABSTRACT

A light coupling arrangement for use with a central lighting system having a high brightness light source disposed in a housing includes a plurality of optical fibers having input ends and output ends which are distributed to various spaced apart location in the desired manner. The input ends of the optical fibers are stripped of cladding and compressed together within a first sleeve member so that boundaries between individual optical fiber input ends are substantially eliminated thereby resulting in a color and intensity mixing at such input end which translates to a uniform color and intensity distribution to the various spaced apart locations. A rod member can be disposed in optical contact with the input ends of the optical fibers and together with the optical fibers, slip fit within an outer sleeve member that assists the first sleeve member in maintaining the compressed relation of the input ends of the optical fibers. The rod member is constructed of a light transmissive material and has a higher thermal coefficient than the optical fibers thereby protecting such input ends from damage as may be caused by the high brightness light source.

14 Claims, 3 Drawing Sheets

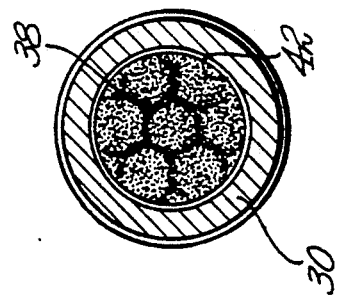
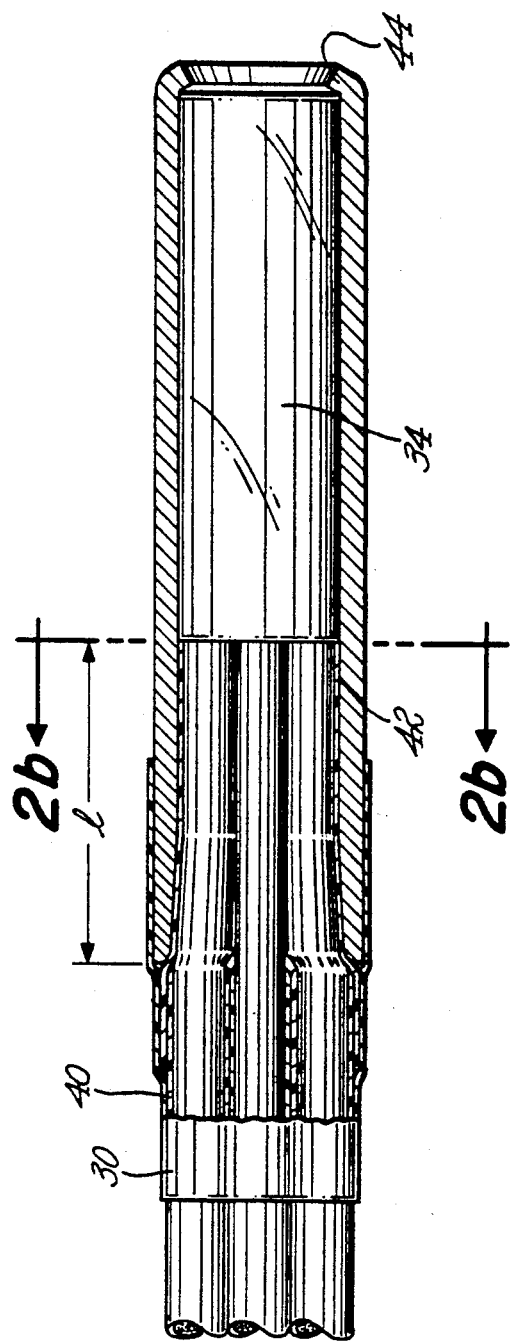

५,२५९,०५६

COUPLER APPARATUS FOR USE WITH A HIGH BRIGHTNESS LIGHT SOURCE

FIELD OF THE INVENTION

This invention relates to an optical coupling arrangement for use between a high brightness light source and a plurality of optical fibers. More particularly, this invention relates to such an optical coupling arrangement which is effective for preventing damage to the optical fibers as may be caused by the high brightness light source and furthermore, achieves a uniform color mix and intensity measure for each of the individual fibers.

BACKGROUND OF THE INVENTION

Central lighting systems wherein a single light source is used to supply light output to a number of spaced apart locations using a plurality of optical fibers have been proposed for a number of various applications including automotive, display and home lighting. For instance, U.S. Pat. No. 4,958,263 issued to Davenport et al on Sep. 18, 1990 and assigned to the same assignee as the present invention, discloses the use of a central lighting system for an automotive application. The light source for such a central lighting system must be capable of providing a light output having high brightness characteristics so as to insure sufficient light output at the spaced apart locations. U.S. patent application Ser. No. 07/858,906 entitled "High Brightness Discharge Light Source" filed contemporaneously herewith in the name of Allen et al and assigned to the same assignee as the present invention, discloses a light source having a brightness characteristic measured in excess of 50,000 lumens per centimeter squared. A light source having this level brightness output and which would be used in conjunction with a reflector arrangement for focussing the light output to an optical focal point at which the optical fibers are disposed, can cause physical damage to the ends of the optical fibers placed at such optical focal point. One theory for the cause of such damage is that the image of the anode of the discharge light source contains more of an infrared radiation component than does the actual arc discharge and that such IR radiation is the cause of the damage to the optical fiber ends. Accordingly, it would be advantageous that in a central lighting system having a high brightness light source, means could be provided that would prevent damage to the ends of the optical fibers that may be caused by IR radiation or some other source of heat or radiation.

Central lighting systems are utilized in applications where it is necessary to distribute the light output to a relatively large number of different locations thereby necessitating the use of a large number of individual optical fibers. Given that there is only a limited space in which to dispose the ends of the optical fibers for receiving the light output, it would be advantageous if as large a number of small diameter fibers as possible could be accommodated or, conversely that if larger diameter optical fibers were used, that as many as possible could be packed within the space provided for receiving the light output of the light source. This concept is typically referred to as the packing fraction of the optical coupling arrangement. One arrangement for achieving a high packing fraction is disclosed in U.S. Pat. No. 5,058,985 issued to Davenport et al on Oct. 22, 1991 and assigned to the same assignee as the present invention. In this patent, it is disclosed that a combination of compressible and non-compressible fibers are disposed within a sleeve member sized so that the compressible fibers are pressed in a conforming shape around the non-compressible fibers thereby achieving a relatively uniform cross-sectional surface area at the optical coupler input. Although such an arrangement has proven effective in increasing the packing fraction for a grouping of optical fibers, such an arrangement could be susceptible to damage caused by heat or IR radiation.

It has also been found that the spacing that exists between the fibers as caused by the cladding disposed around each individual optical fiber, detracts from the useful space for coupling and moreover, establishes a separate position for each of the fibers at the face of the optical coupling device. The separate positioning characteristic has the inherent disadvantage that there is a distinct index of refraction for each fiber that results in the reflection of light at the walls of each fiber. When one considers that the light image received by each of the individual fibers will only see the color and intensity of light output from the light source at its specific position at the face of the optical coupler, the result is a variance in color and intensity properties at the optical fiber outputs. For optical fibers in the middle of the optical coupler, the color characteristics and the intensity of the light received will differ from that of the optical fiber located at the outer perimeter of the optical coupler. U.S. Pat. No. 4,662,714 issued to Mori on May 5, 1987 discusses stripping the cladding from a portion of the optical fibers; such disclosure however makes no reference to the desirability of providing for a mixture of the light so as to achieve uniform color and intensity characteristics over each of the individual optical fibers. Accordingly, it would be advantageous for an optical coupling device which accommodates a plurality of individual optical fibers to provide a means for mixing the color and intensity properties so that each of the fibers transmits to its end destination, light output having uniform characteristics regarding color and intensity.

SUMMARY OF THE INVENTION

The present invention provides a coupling arrangement for use with a high brightness light source and a plurality of optical fibers wherein the optical fibers are protected against damage as may be caused by IR radiation or heat caused by the high brightness light source. The present invention also provides that the light transmitted by each of the individual optical fibers coupled to the light source is substantially uniform in color and intensity.

In accordance with the principles of the present invention, there is provided a light coupling apparatus for coupling light output from a high brightness light source to a plurality of spaced apart output locations using a plurality of optical fibers at least some of which are of a compressible type. Each of the optical fibers has removed therefrom, a substantially equivalent length of cladding from the end closest to the light source. A first sleeve member is disposed in surrounding relation to the portion of the plurality of optical fibers from which the cladding has been removed and is sized so that the unclad ends of the optical fibers are compressed into having a substantially uniform cross-sectional surface and one in which partitions between the individual optical fibers is substantially eliminated. A light transmissive intermediate rod member is disposed between the light source and the substantially uniform cross-sectional surface of the optical fibers and is constructed of a material having a higher thermal coefficient than the optical fibers. An outer sleeve member is disposed in at least a partially surrounding relation the first sleeve member and at least a portion of the intermediate rod member. The outer sleeve member may have a rolled open end wherein the intermediate rod member is confined so as to establish a fixed input position for disposition at the optical focal point of the light source.

BRIEF DESCRIPTION OF THE DRAWINGS

In the following detailed description, reference will be made to the attached drawings in which:

FIGS. 2a and 2b are elevational views partly in section of the light coupling device constructed in accordance with the present invention.

DETAILED DESCRIPTION OF THE INVENTION

Figure 1:
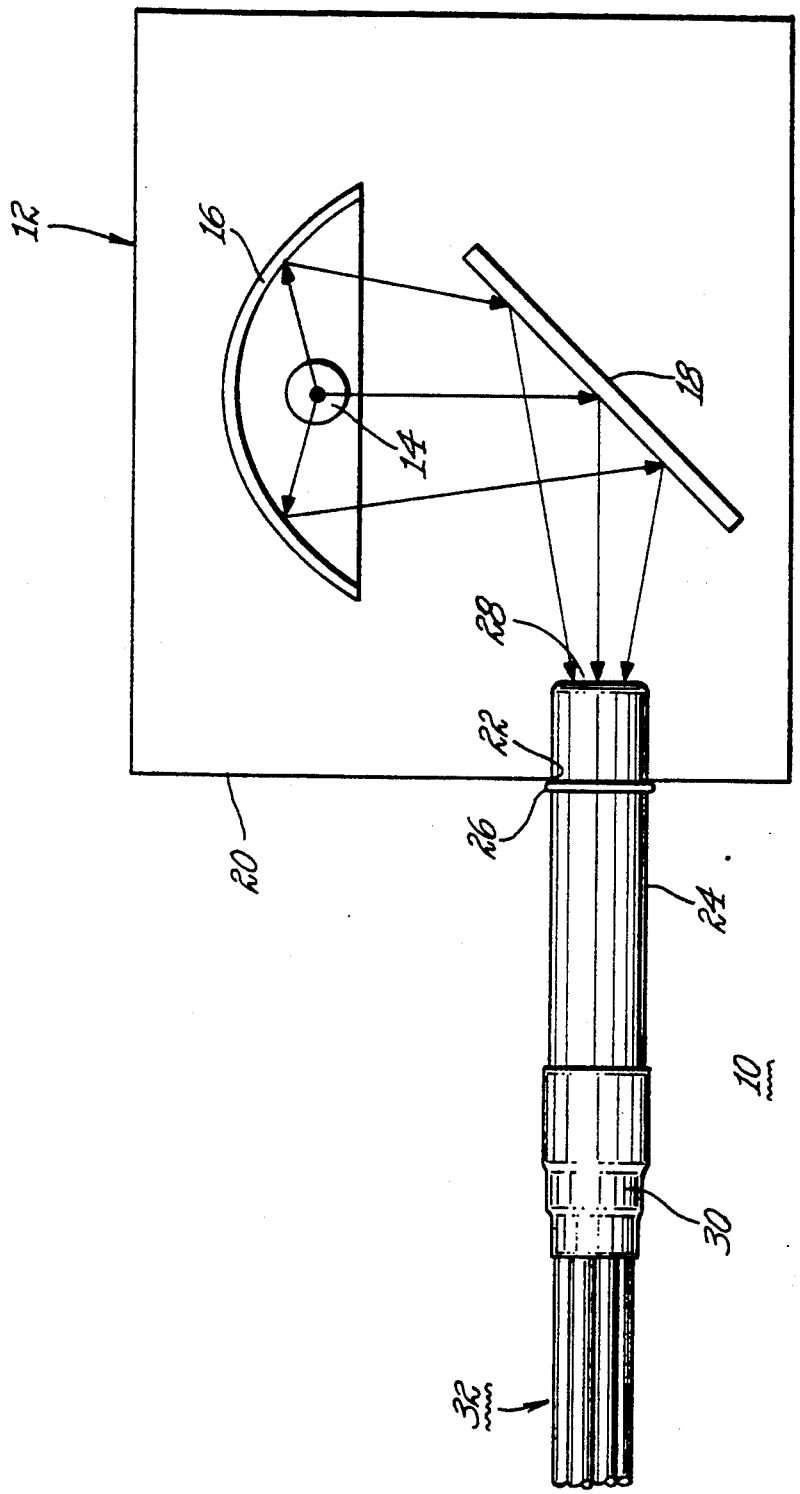
FIG. 1 is an elevational view partly in section of a light source and light coupling arrangement constructed in accordance with the present invention.

As seen in FIG. 1, the coupling arrangement 10 of the present invention is particularly suitable for use with a high brightness light source 12 which includes a high brightness lamp 14, a reflector member 16 and a mirror element 18 arranged so as to provide an image of the light source to the input surface area of the coupling device 10. By use of the relative term "high brightness", it is meant that any light source with an output of approximately 40,000 lumens per centimeter squared effective brightness, would satisfy the requirements of the present invention although, it is preferred that the light source 12 have an effective brightness on the order of approximately 50,000 lumens per centimeter squared. The light source 12 may also include a housing 20 in which the lamp 14, reflector 16 and mirror 18 elements may be disposed. The housing 20 may protect the lamp 14 from possible physical damage as well as serving to shield persons in the near vicinity of the light source 12 from heat or radiation resulting from the light output of the lamp 14.

An opening 22 is formed in the light source housing 20 so that the coupling arrangement 10 of the present invention can be inserted to a position within the housing 20 such that the input to the coupling arrangement 10 can be coincident with the optical focal point of the light source 12. The coupling arrangement 10 includes an outer sleeve member 24 which has formed thereon, an annular lip member 26 disposed along the outer periphery of the outer sleeve member 24 at a location so that the positioning of the front cross-sectional surface 28 of the coupling device 10 is automatically established at the optical focal point without the need for fine tuning or other costly alignment operations. Of course, it can be appreciated that the lip member 26 can also be satisfied by a stop device disposed on the outer sleeve 24 at the same position as the lip member 28 and that such stop device need not be annular.

A third sleeve member 30 is disposed around the end of the outer sleeve 24 through which the plurality of optical fibers 32 extend for distribution to the various remote locations at which the light output is to be utilized. The third sleeve member 30 includes a tapered rear portion 34 which tightly surrounds the optical fibers 32 so as to prevent inadvertent strain on such fibers during installation or servicing of the lighting system of which the coupling arrangement 10 and light source 12 are a part. The function of the third sleeve member 30 may be satisfied by the use of a shrink type of sleeve material which, when heated, shrinks to the tightly conforming fit as is needed of the third sleeve member 30.

Positioning of the coupling arrangement 10 of the present invention within the housing 20 so that the cross-sectional surface 28 is at the optical focal point of the lamp 14/reflector 16 configuration can result in a physical integrity problem with respect to the optical fibers 32 when such fibers 32 are used in conjunction with the high brightness lamp 14 as in the present instance. If the lamp 14 is placed in a specific location within the reflector 16, it may be possible to cause the ends of the optical fibers 32 near the focus of the reflector 16 to be damaged. One theory for the cause of such damage is that the image of the anode (not shown) of the lamp 14, which contains more infrared radiation than the actual arc discharge of the lamp 14, can melt the plastic material from which the optical fibers 32 are constructed. Furthermore, inasmuch as any grouping of optical fiber ends at the focal plane located at the cross-sectional surface 28 of the coupling arrangement 10 could inherently result in an uneven distribution of the color and intensity properties of the light output across such cross-sectional surface 28, it is also the desire of the present invention to spread out the light in the focal plane so that the light entering each of the individual optical fibers 32 is essentially the same in both color and intensity. As seen in FIG. 2a, in order to achieve such light mixing properties and to prevent damage to the input ends of the optical fibers 32, a rod member 34 is disposed in the outer sleeve member 24 in a position intermediate the focal plane and the input ends of the optical fibers 32. The rod member 34 will be made of a light transmissive material and will have a higher thermal coefficient than the optical fibers 32. The rod member 34 can be constructed of a short length of quartz or glass and can be cylindrically shaped with its optical axis disposed in alignment with the center axis of the light output reflected from the reflector 16/mirror 18 configuration. It is also possible to dope the quartz or glass material of rod member 34 with titania ceriate so that any UV radiation generated by the lamp 14 can be absorbed thereby. At the end of the rod member 34 disposed at the focal plane of the light source 12, it can be seen in FIG. 2a that a rolled portion of the outer sleeve member 24 is formed so that the rod member 34 can be maintained in the specific position to insure maximum light coupling efficiency to the optical fibers 32.

In order to insure the highest coupling efficiency between the rod member 34 and the adjacent ends of the optical fibers 32, the rod member 34 end is polished so that a uniform surface formed at the input ends of the optical fibers 32 can be pressed to the rod member 34. As seen by the intersecting line 2b in FIG. 2a, the input surface of the grouping of optical fibers forms a substantially flat surface which conforms to the polished flat surface of the rod member 34 to achieve the efficient coupling from the rod member 34 to the plurality of optical fibers. The plurality of optical fibers 32 as shown in FIG. 2b can be comprised of a grouping which includes a central optical fiber surrounded by a first layer of optical fibers 32 arranged circumferentially around the central optical fiber. Of course, it can be realized that other arrangements of optical fibers and other shapes of optical fibers in addition to merely the illustrated round shape can be provided while still maintaining the uniform surface presented to the rod member 34 and that such alternate arrangements are also contemplated as being within the scope of the present invention. To achieve the uniform surface at the input ends of the optical fibers 32, it is possible to first group the fibers together and then perform one slicing operation on such grouping of fibers thereby resulting in a clean smooth surface at the input ends of the optical fibers 32 that is then pressed into a contact with the polished surface of the rod member 34.

The grouping of optical fibers 32 illustrated in FIG. 2b includes shaded portions 38 between the fibers. These shaded portions 38 indicate an amorphous, boundaryless relation between the various individual optical fibers 32 that comprise the grouping. To achieve this amorphous relation, a portion of the cladding disposed around each of the optical fibers is removed for a predetermined, essentially equivalent length over each of the fibers. As seen in FIG. 2a, this length, designated l, allows that the individual unclad optical fiber portions can be more tightly compressed relative to one another for this length l. The length l is selected so that a sufficient space is provided in which to achieve the necessary light mixing. Though this length l can be selected from a range of values it is contemplated that such length should be related to the cross-sectional area of the input ends of the optical fibers and should be in the range of approximately 3 to 8 times such area.

The portions of the optical fibers 32 on which the cladding 40 remains in place, can be seen to result in the grouping of optical fibers occupying a larger cross-sectional area than is required for the portion from which the cladding 40 has been removed. In fact, because of the distinctions in cross-sectional area, it can be seen that the outer sleeve member 24 is internally tapered at the end from which the optical fibers 32 exit.

The ends of the optical fibers 32, including the unclad portions as well a specific length of the cladded portion, are fitted within an inner sleeve 42 which can be sized such that the unclad portions of the optical fibers can be pressed closely together by such inner sleeve 42. The close pressing of the unclad portions of the optical fibers 32 can be accomplished by the use of a heat shrinkable Teflon tubing for the inner sleeve member 42. This Teflon sleeving has a low index of refraction and thereby serves as cladding around the bundle of optical fibers 32 so that total interval reflection occurs. This function can also be accomplished by use of a Teflon sleeve whose size is chosen to that the area of its opening is slightly less than the sum of the cross-sectional areas of the individual optical fibers 32. The optical fibers 32 can be stretched so that the sleeve 42 may be slipped over the stretched optical fibers 32. When the inner sleeve 42 is in place, the stretching operation is stopped and the optical fibers 32 are allowed to shrink in length and expand in area so that the slightly smaller cross-sectional area of the inner sleeve 42 is completely occupied. The ends of the optical fibers 32 protruding from the end of the inner sleeve 42 are then cut to form the smooth uniform surface which is pressed into close contact with the rod member 34 to achieve optical wetting of the fiber surfaces and thus, the efficient optical coupling therebetween. By this close pressing of the unclad portions of the optical fibers 32, the surfaces of the individual optical fibers 32 become optically wetted thereby essentially disappearing. In other words, the reflection of light typically resulting from the change of the index of refraction associated with the walls of the optical fibers, does not occur. As a result, the light from all parts of the discharge produced by the lamp 14 can be mixed together within the rod member 34 and within the optical fibers 32 which act essentially in the nature of a single large diameter optical fiber. Additionally, because of the squeezing action resulting from the smaller area inner sleeve 42, the unclad portions of the individual optical fibers 32 essentially flow together so that there is very little dead space between the optical fibers, in this manner, the packing fraction of the coupler arrangement 10 of the present invention is improved allowing for maximum amount of light to enter the optical fibers 32 and the use of a larger number of optical fibers 32 that can then be channeled to more remote locations.

After having been pressed together by the inner sleeve 42 and connected to the rod member 34, the portions of the optical fibers 32 covered by inner sleeve 42 and the rod member 34 form a rod and fiber configuration which is inserted into the outer sleeve member 24. The outer sleeve member 24 can be made of aluminum and, as seen in FIG. 2a, can have an inner tapered portion so that, when the rod and fiber configuration are fit into the outer sleeve 24, a slip fit is achieved which further compresses the unclad optical fiber portions and serves to maintain the tight fit resulting from the use of the inner sleeve 42.

Figure 3:
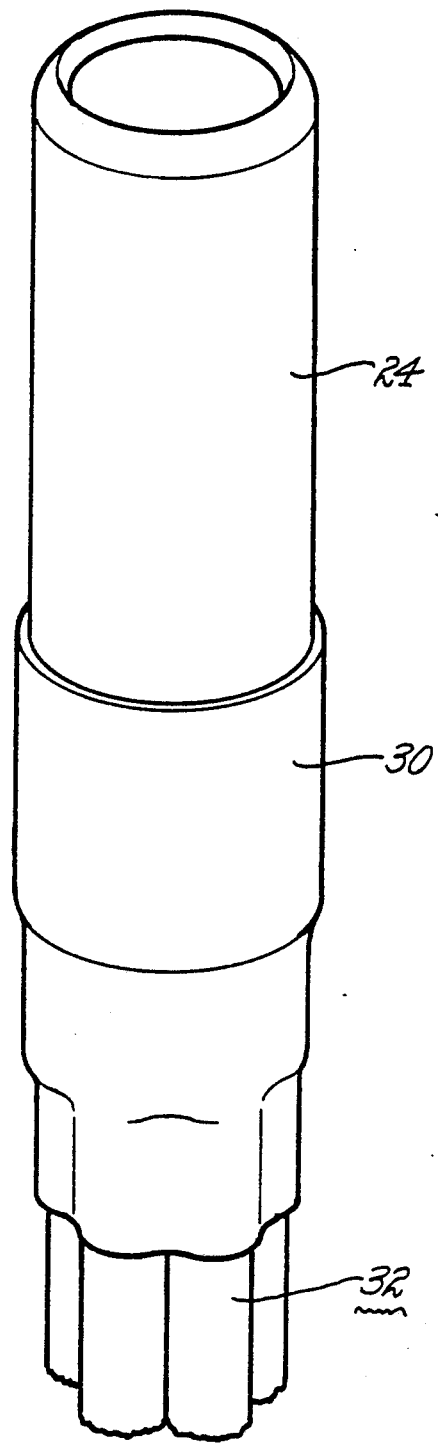
FIG. 3 is an elevational view of a light coupling device constructed in accordance with an alternate embodiment of the present invention.

The third sleeve 30 is placed around the end of the outer sleeve member 24 and a portion of the optical fibers 32 as they exit that end of the outer sleeve 24. FIG. 3 illustrates a perspective view of the coupling arrangement 10 of the present invention wherein the third sleeve member 30 is indicated as being conformed in shape to the shape of the grouping of optical fibers 32 as they exit the outer sleeve member 24, such shape conformance coming about as a result of utilizing a heat shrinkable material for the third sleeve 30.

Although the above description of the invention constitutes the preferred embodiment of the invention, modifications can be made thereto without departing from the scope of the invention as set forth in the appended claims. For instance, although the outer sleeve member 24 is illustrated as surrounding only that portion of the optical fibers 32 from which the cladding has been removed, it is possible to provide a more pronounced inner taper that would accommodate insertion of a length of the clad portion of the optical fibers 32 as well.

We claim:

1. A light coupling arrangement for coupling light output from a high brightness light source to a plurality of spaced apart output locations, said light coupling arrangement comprising:

a plurality of optical fibers at least some of which are compressible and wherein at least some of said optical fibers have a covering disposed on at least a portion thereof;

a first sleeve member disposed in surrounding relation to at least a portion of the lengths of said optical fibers which is uncovered;

wherein said first sleeve member has a front end at which said plurality of optical fibers terminate to an essentially flat cross-sectional surface;

a light transmissive rod member disposed between said light source and said cross-sectional surface of said plurality of optical fibers and having an input end receptive of light output from said light source and an output end optically coupled to said plurality of optical fibers, said rod member having a higher thermal coefficient than said plurality of optical fibers and further being effective so that such light output received at said input end of said rod member is mixed internally of said rod member to achieve a further light output from said rod member which is substantially uniform in color and intensity; and an outer sleeve member disposed in at least a partially surrounding manner to both said first sleeve member and at least a portion of said rod member.

2. The light coupling arrangement as set forth in claim 1 wherein said light source includes a housing, a lamp and reflector means disposed within said housing, said reflector means being effective for focussing light output from said lamp to an optical focal point, said outer sleeve member having a stop formed on the outside thereof which, when said stop contacts said housing, said input end of said rod member is positioned at said optical focal point of said reflector means.

3. The light coupling arrangement as set forth in claim 2 wherein said rod member is constructed of quartz and is cylindrically shaped so as to have an optical axis which is coincident with the optical axis of said reflector means light output.

4. The light coupling arrangement as set forth in claim 1 further comprising a third sleeve member disposed around a portion of said outer sleeve member and said plurality of optical fibers as said optical fibers exit said outer sleeve member, said third sleeve member being a heat shrinkable sleeve member which, when heat shrunk, forms a tight fit around said plurality of optical fibers.

5. The light coupling arrangement of claim 1 wherein said first sleeve member is sized so that said portions of said optical fibers from which said covering has been removed are pressed tightly against one another thereby resulting in an essentially boundaryless relation between said portions of said optical fibers within said first sleeve member.

6. The light coupling arrangement of claim 5 wherein said first sleeve member is constructed of a transparent material having an index of refraction substantially lower than the index of refraction associated with said plurality of optical fibers.

7. The light coupling arrangement as set forth in claim 1 wherein said outer sleeve member is constructed of a non-light transmissive material and has formed on a portion of the inner surface thereof, a tapered region at which portions of said plurality of optical fibers for which said covering remains, are disposed therein.

8. The light coupling arrangement as set forth in claim 1 wherein said outer sleeve member has a rolled end formed adjacent said input surface of said rod member, said rolled end being effective so that said rod member is prevented from movement away from said optical focal point.

9. The light coupling arrangement as set forth in claim 8 wherein said outer sleeve member is formed having an inward tapered portion at the end opposite said rolled end, said end on which said inward tapered portion is formed being effective such that said rod member and said inner sleeve member form a slip fit within said outer sleeve member.

10. A light coupling apparatus for use with a central lighting system and capable of delivering light output from a light source to preselected spaced apart locations, said light coupling apparatus comprising:

a plurality of compressible optical fibers each having an input end and an output end, said plurality of optical fibers further having a covering disposed thereon and wherein a portion of said covering is stripped for a predetermined length along said input ends of said optical fibers;

a first sleeve member having a front opening at which said input ends of said optical fibers are positioned, said front opening being smaller in cross-sectional area than the sum of the cross-sectional areas of said input ends of said optical fibers, said smaller front opening of said first sleeve being effective such that said input ends of said optical fibers are compressed together and partitions between individual ones of said input ends of said optical fibers are substantially eliminated thereby;

said first sleeve member having a second opening of a larger cross-sectional area than said front opening, said second opening being sized so that portions of said optical fibers on which said covering is disposed can pass through said second opening in a tight fitting manner;

an outer sleeve member of non-light transmissive material disposed in surrounding relation to at least a portion of said first sleeve member, said outer sleeve member being internally tapered so as to assist said first sleeve member in maintaining said input ends of said optical fibers in a compressed, partitionless relation to one another, and;

a rod member disposed between said light source and said input ends of said plurality of compressible optical fibers, said rod member being made of a light transmissible material and being effective to thermally insulate said plurality of optical fibers from said light source and to mix the light output of said light source in terms of color and intensity.

11. The light coupling apparatus as set forth in claim 10 wherein said outer sleeve member is constructed of a rigid material and further wherein a second outer sleeve member of flexible, shrinkable material is disposed around the open end through which said output ends of said optical fibers pass to be distributed to said preselected spaced apart locations, said second outer sleeve member being effective for preventing strain to said optical fibers as said optical fibers exit said outer sleeve member.

12. The light coupling apparatus as set forth in claim 10 wherein said light source is disposed within a housing and wherein said outer sleeve member fits within a opening formed in said housing in a manner such that an input end associated with said outer sleeve member is positioned at the optical focal point of said light source.

13. The light coupling apparatus as set forth in claim 10 wherein said first sleeve member is constructed of a transparent material having an index of refraction substantially lower than the index of refraction associated with said plurality of optical fibers.

14. The light coupling apparatus as set forth in claim 10 wherein said predetermined length of said covering stripped from said input ends of said plurality of optical fibers is between three and eight times longer than the longest linear dimension associated with said sum of the cross-sectional areas of said input ends of said optical fibers.

* * * * *